March 6, 1962 — W. S. TANDLER ETAL — 3,023,506
CONTOUR MEASURING APPARATUS
Filed Aug. 7, 1958 — 3 Sheets-Sheet 1

INVENTORS.
WILLIAM S. TANDLER &
MORRIS GROSSMAN
BY ARTHUR SLOAN their ATTORNEYS.

INVENTORS.
WILLIAM S. TANDLER &
MORRIS GROSSMAN
BY ARTHUR SLOAN their ATTORNEYS.

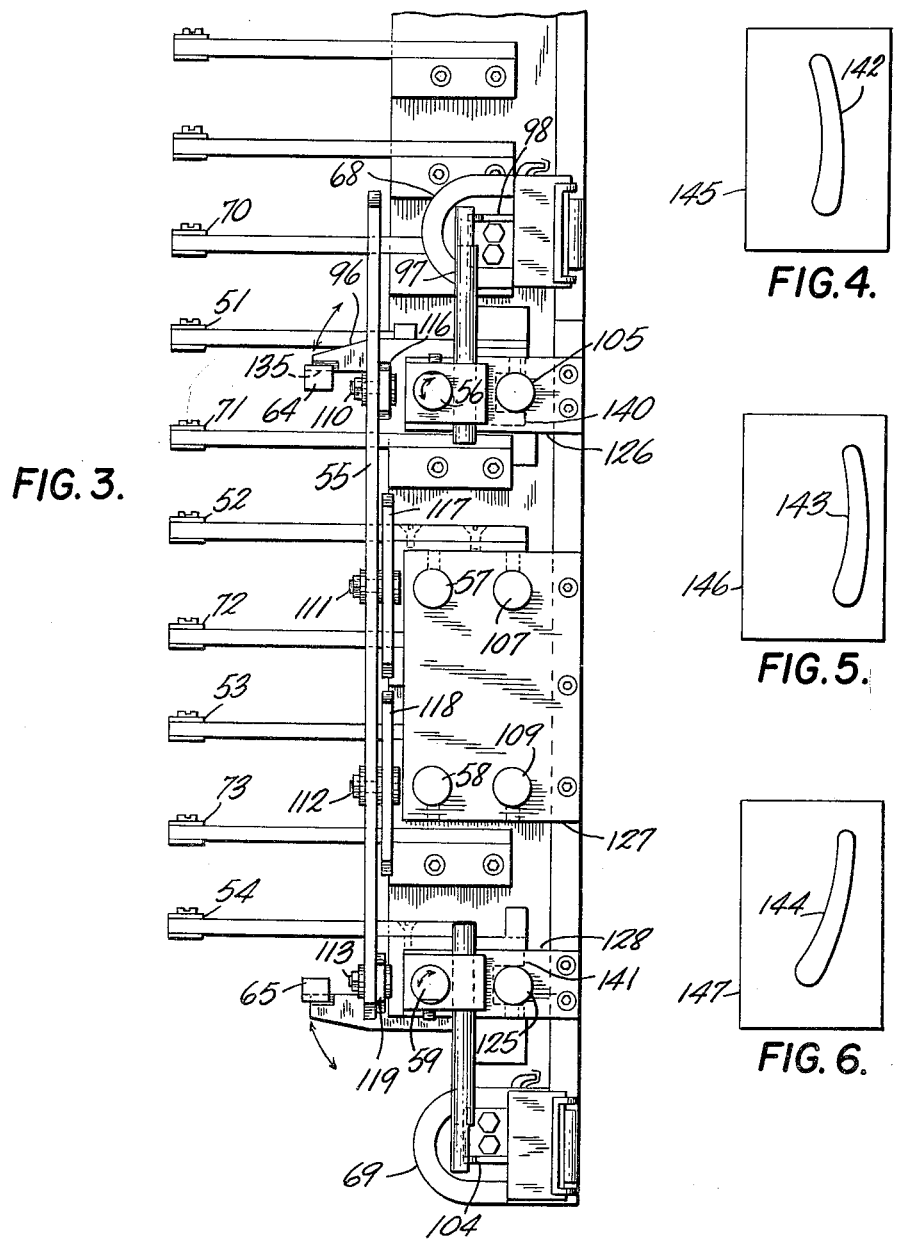

United States Patent Office 3,023,506
Patented Mar. 6, 1962

3,023,506
CONTOUR MEASURING APPARATUS
William S. Tandler, New York, Morris Grossman, Brooklyn, and Arthur Sloan, East Rockaway, N.Y., assignors to The Warner & Swasey Company, Cleveland, Ohio, a corporation of Ohio
Filed Aug. 7, 1958, Ser. No. 753,742
6 Claims. (Cl. 33—174)

This invention relates to a gauging apparatus and more particularly to an apparatus which will automatically measure the contour of a work piece.

The apparatus of this invention is adapted to be incorporated into the apparatus for automatically dimensionally inspecting and assorting turbine buckets and compressor blades as described and shown in copending application Serial No. 578,841, filed April 17, 1956, now Patent No. 2,892,257, granted June 30, 1959, in the name of William S. Tandler et al.

Reference to the pure contour of a work piece in the subsequent discussion is intended to indicate the contour as defined in relation to a set of coordinates which will be translationally moved and angularly twisted by an amount equal to the translational movement and angular twist of a work piece relative to a stationary reference point.

By angularly oriented contour is intended the contour of a work piece as defined in relation to a set of coordinates which will be translationally moved by an amount equal to the translational movement of the work piece relative to a stationary reference point but which will not be angularly twisted as the work piece is twisted.

By absolute contour is intended the contour of a work piece as defined in relation to a set of stationary coordinates, i.e., the coordinates will not move as the work piece is translationally moved and angularly twisted relative to a stationary reference point.

The apparatus described in the copending application Serial No. 578,841 will measure the absolute contour of a work piece mounted on a block. Since all points on the contour of the work piece are referenced to a stationary reference point and stationary coordinates, there can be only one position on the block for which the absolute contour measuring apparatus is able to indicate a perfect contour. If the work piece is translationally displaced on the block the absolute contour measuring apparatus will indicate a deviation from the standard even though the angularly oriented contour, as defined above, is perfect. Also, if the work piece is angularly twisted as well as translationally displaced, the absolute contour measuring apparatus will indicate a deviation from the standard even though the pure contour, as defined above, is perfect.

It is therefore an object of this invention to provide an apparatus which will measure the angularly oriented contour of the work piece, that is, the contour regardless of the translational displacement of the work piece on the block.

It is another object of this invention to provide an apparatus which will measure the pure contour of the work piece, that is, the contour regardless of the translational displacement and the angular twist of the work piece on the block.

These and other objects of the invention are accomplished by coupling a group of detectors to an adjustable indicating means. If the indicator is kept stationary once the detectors have contacted the work piece, the apparatus can measure only the absolute contour since there can be only one correct pattern. But by making the indicator movable, the apparatus can measure a group of patterns and will therefore measure the angularly oriented contour. By making the indicator angularly adjustable as well as movable, the apparatus can measure the pure contour, which is free from translational displacement and angular twist.

A summary of one embodiment of the invention comprises a plurality of measuring probes mounted in groups of four at different levels on a probe carriage for movement into contact with the work piece to be tested. The probes of one group measure the pure contour while the probes of another group measure the angularly oriented contour. A tolerance bar is coupled for movement with each probe in such a way that the position of the probe will determine the position of the tolerance bar. When all the probes have contacted the surface of the work piece being tested, the pattern of the tolerance bars will be representative of the contour of the work piece at the points of contact of the probes.

A group of styli, one for each tolerance bar, are positioned on a carriage so that they will sweep over the tolerance bars. A portion of each tolerance bar and the styli are of an electrically conductive material and have an indicator connected between them so that if all of the styli rest on the conductive portions of the tolerance bars simultaneously, the indicating means will be energized.

Translational displacement of the work piece on the block is compensated for by having the styli sweep across the tolerance bars, so that if the tolerance bars are in any one of a group of patterns the styli will still rest on the conductive portions simultaneously. The twist is compensated for by coupling the two outermost probes of one group to the styli to twist the position of the styli by an amount equal to the twist of the blade before they sweep over the tolerance bars. The twist of the blade is still reflected in the pattern of the tolerance bars, but since the styli have also been twisted, the effect of the twist on the tolerance bars is cancelled.

This invention may be better understood from the following detailed description taken in conjunction with the accompanying drawings in which:

FIG. 3 is a right side view of the styli carriage;

FIG. 4 shows a blade mounted in the ideal position on the block;

FIG. 5 shows a blade translationally displaced on the block; and

FIG. 6 shows a blade angularly twisted on the block.

Figure 1:
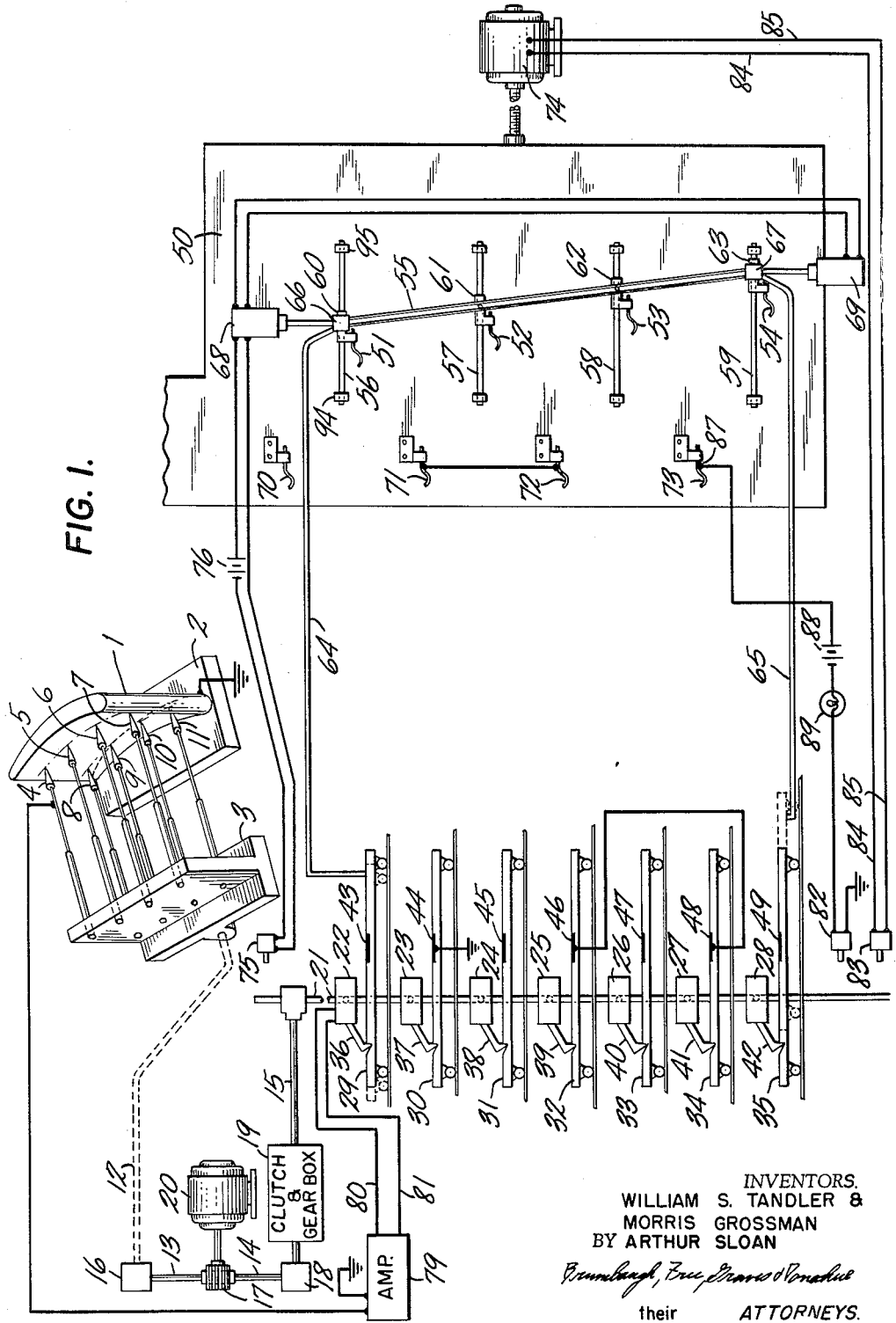
FIG. 1 is a schematic drawing showing the operation of one embodiment of the invention.

In FIG. 1 there is shown the test piece 1, which may be a turbine blade, a compressor bucket, a propeller, or the like, mounted on a supporting block 2. Two groups of probes are shown mounted on the probe carriage 3. The group containing probes 8–11 measures the angularly oriented contour while the group containing probes 4–7 contains the twist compensating probes and measures the pure contour of the blade. Each probe is retractably mounted in the probe holders so that the carriage may continue to move forward after the probes have contacted the blade. Probes 4 to 10 are connected to a different one of solenoid disconnect mechanisms 22–28 through an amplifier. In the illustration, probe No. 4 is shown connected to the amplifier 79 and then to the solenoid disconnect mechanism 22, and is representative of the connection of all the probes to the solenoid disconnect mechanisms. Probes 4–10 are connected through amplifiers to solenoid disconnect mechanisms 22, 24, 26, 28, 23, 25 and 27, respectively. The solenoid disconnect mechanisms 22 to 28 are coupled together by the tolerance bar drive carriage 21. There is another probe bank and measuring apparatus on the other side of the blade, but since they are similar only one set will be described.

The drive means 20, which may be powered by electricity or air pressure, is coupled, through gear boxes 16–18 and links 12–15, to the probe carriage and to the tolerance bar drive carriage, and drives the two carriages at proportional rates. The clutch and gear box 19 magnifies the movement of the probe carriage by a ratio of 40 to 1 so that if the probe carriage moves 1/40 of an inch the tolerance bar drive carriage moves 1 inch.

The solenoid disconnect mechanisms 22–28 are connected to tolerance bars 29–35, respectively, by means of a pawl and detent engagement when the solenoids are not energized. The tolerance bars are shown as mounted on rollers so that they may be easily moved horizontally either to the right or to the left when they are engaged by the solenoid disconnect mechanisms. When the tolerance bars are not engaged by the solenoid disconnect mechanisms they may be braked to the frame by conventional means or in the manner described in applicants' copending application Ser. No. 578,841.

The contour styli carriage 50 has mounted thereon a plurality of styli equal in number to the tolerance bars. The straight contour styli 71–73, for measuring the angularly oriented contour, are mounted in a fixed position on the contour styli carriage 50 so that they will sweep over the surfaces of the tolerance bars 30, 32 and 34. Additional styli and tolerance bars, equal in number to the probes, for measuring the angularly oriented contour at other levels, may be mounted above those shown. The four twist adjusted styli 51–54 for measuring the pure contour are mounted on a separate carriage which in turn is mounted on the contour styli carriage 50. Four shafts 56 through 59 are mounted on the contour styli carriage by braces, such as braces 94 and 95 holding the shaft 56. One each shaft are styli supports 60–63 supporting the styli 51–54, respectively. Each of the styli supports will slide horizontally along the shafts 56–59 and are coupled together by the pivot bar 55. The pivot bar is shown coupled to the tolerance bars 29 and 35 through the links 64 and 65 and the solenoid trip and brake mechanisms 66 and 67.

When the probe carriage 3 and the tolerance bar drive carriage 21 reach the end of their travel, the tolerance bar drive carriage 21 actuates the microswitches 75, 82 and 83. Closure of the microswitch 75 completes a circuit whereby current will flow through the switch, the battery 76, solenoids 68 and 69, and back to the microswitch 75. When the solenoids 68 and 69 are energized, the trip and brake mechanisms 66 and 67 are tripped and release the pivot bar 55 from the links 64 and 65, and brake the pivot bar to the contour styli carriage.

Closure of the microswitch 83 energizes the drive means 74, which may be an electric motor. The stylus carriage 50 is then propelled forward so that the styli sweep over the tolerance bars. Each of the tolerance bars has a portion 43–49 which is of an electrically conductive material. The straight contour styli 71–73 and the conductive portions of tolerance bars 44, 46 and 48 are electrically connected in series so that when microswitch 82 is closed, if the straight contour styli are all on the conductive portions simultaneously, the indicator 89 will be energized. The twist adjusted styli and tolerance bars are also connected in series similar to that described with regard to the straight contour styli.

The construction of the retractable probes and probe holders, the drive carriages and linkages, the solenoid disconnect mechanisms, the tolerance bar drive carriages and tolerance bars are all described in the copending application Serial No. 578,841, filed April 17, 1956.

Figure 2:
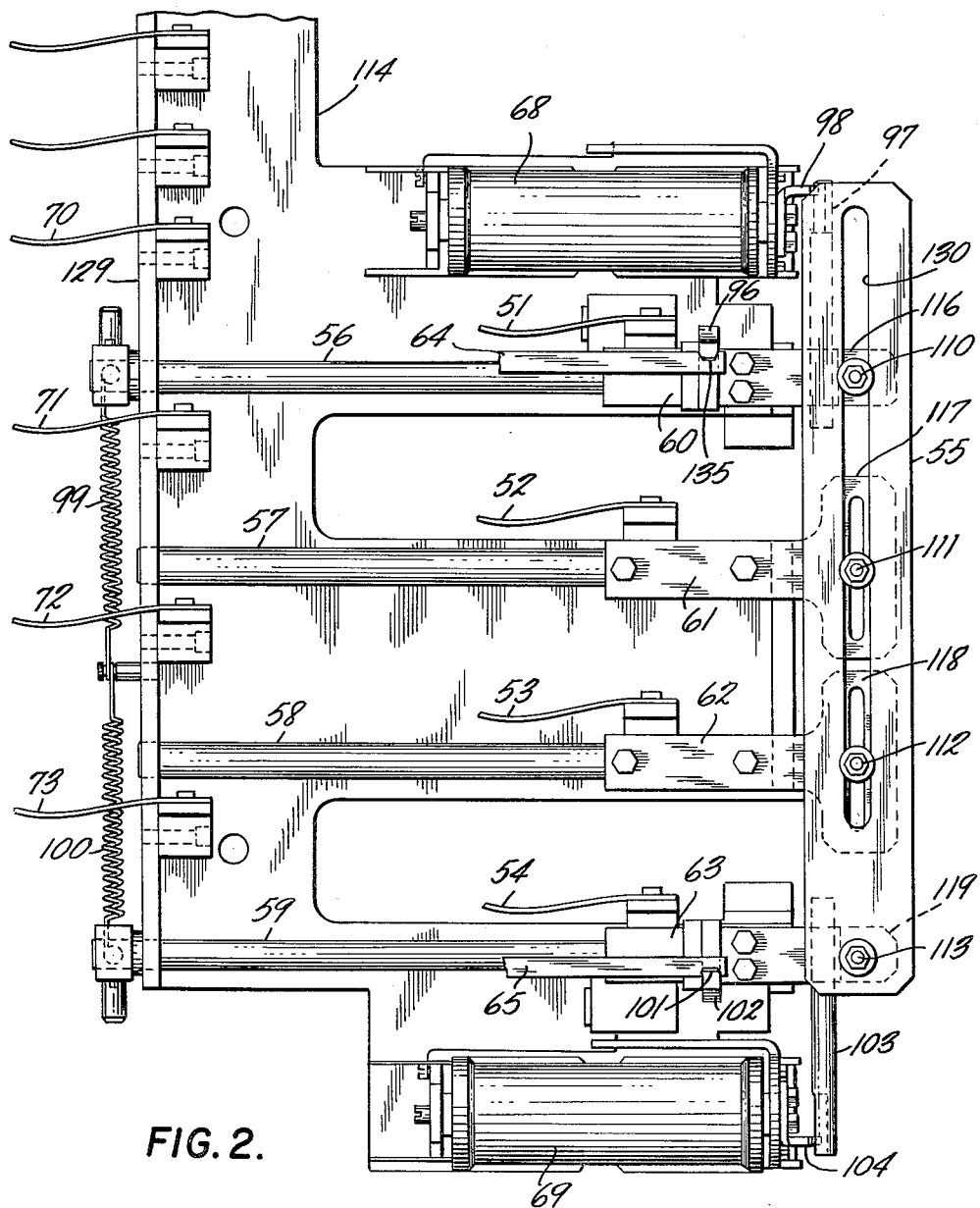
FIG. 2 is a drawing showing the styli carriage.

FIG. 2 shows in detail the construction of the styli carriage. The straight contour styli, such as styli 70–73, are mounted in fixed positions on the frame 114, while the twist adjusted styli 51–54 are mounted for horizontal movement along the shafts 56–59. The shafts 56 and 105, better shown in FIG. 3, which support the twist adjusted stylus 51, are held in position on the frame by the plates 126 and 129. The shafts 57, 58, 107 and 109 which support styli 52 and 53 are held in place on the frame by the plates 127 and 129. The shafts 59 and 125 support stylus 54 and are supported by plates 128 and 129. The shafts 56 and 59 are rotatably mounted on the plates and are part of the trip and brake mechanism as will be hereinafter explained.

The four twist adjusted styli are coupled together by the pivot bar 55 and the four links 116–119. The link 119 is fastened to the pivot bar 55 by the bolt 113 and the other three links are fastened to the pivot bar by the bolts 110, 111 and 112 which are inserted into the slot 130 in the pivot bar. The bolts 110, 111 and 112 are free to slide in the slot 130 as the pivot bar is pivoted about the axis of the bolt 113.

The two shafts 64 and 65 couple the tolerance bars 29 and 35 to the twist compensating mechanism through two solenoid trip and brake mechanisms. In the untripped position, the arm 96, which is coupled to the link 116, fits into the detent 135 of the shaft 64. The arm 96 will slide horizontally along the shaft 56 but is keyed to the shaft so that it will rotate upward when the shaft is rotated. The shaft 56, as shown in the side view of FIG. 3, is urged in a clockwise direction by the force of the tension spring 99. When the solenoid 68 is in a de-energized condition, the arm 96 is held in the detent 135 against the action of a tension spring 99 by the trip mechanism 98 on the solenoid. When the solenoid 68 has been energized, the trip mechanism 98 releases the arm 97 allowing the spring 99 to rotate the shaft 56 and the arm 96 in a clockwise direction. When the arm 96 has been rotated upwards it comes out of connection with the shaft 64 and disconnects the link 116 from the tolerance bar 29 and brakes the link 116 to the contour styli carriage. The braking is accomplished by the brakes 140 and 141 which bear against the shafts 105 and 125.

Energization of the solenoid 69 disconnects the stylus 54 from tolerance bar 35 and brakes it to the contour styli carriage in a manner similar to that described with regard to solenoid 68 and stylus 51. Since the four twist adjusted styli 51–54 are coupled together by the pivot bar 55, the position of the two outermost styli determines the position of all four.

FIGS. 4, 5 and 6 show the positions of three blades 142–144 mounted on supporting blocks 145–147 respectively. Blade 142 is ideally mounted on block 145. Blade 143 is translationally displaced to the right on block 146. Blade 144 is twisted clockwise on block 147. If the probes approach the blade from the left, the pattern of the tolerance bars for blade 143 will be the same as for blade 142 except that there will be a slight displacement to the right. This displacement is compensated for by making the styli sweep across the tolerance bars so that an angularly oriented contour measurement is obtained.

The pattern of the tolerance bars when measuring blade 144 is twisted. To obtain a pure contour measurement the styli are also twisted by an equal amount before they sweep over the tolerance bars.

The operation of the invention may be summarized as follows: A turbine blade is inserted into the supporting block and the probe carriage holding the probes is propelled toward the turbine blade by a drive means. The drive means also propels the tolerance bar drive carriage containing the solenoid disconnect mechanisms and the tolerance bars. As each probe makes contact with the blade, the solenoid disconnect mechanism associated with that probe is energized and disconnects the tolerance bar from the drive carriage. After all of the probes have made contact with the blade, the tolerance bars have been dropped off and assume positions in a pattern representative of the contour of the blade.

Four twist adjusted styli and a number straight contour styli are positioned on the contour styli carriage so that they will sweep over the tops of the tolerance bars. The two tolerance bars associated with the two outermost probes of one group are coupled to the two outermost twist adjusted styli so that they will be twisted by an amount equal to the twist of the blade.

Before the test begins a master blade is inserted into the apparatus and the probes brought into contact with the blade. The positions of the conductive portions are then set so that the styli will all rest on the conductive portions simultaneously. Thereafter the blades are measured by comparing them to the master blade.

As the drive means causes the styli to sweep over the tops of the tolerance bars, a potential is first applied between the four twist adjusted styli and the conductive portions on the four tolerance bars associated with them, so that if all four styli touch the conductive portions simultaneously an indicating means will be energized giving the measurement of the pure contour. After the contour styli carriage has reached the end of its travel in one direction, the drive is reversed and the styli sweep over the tolerance bars again in the opposite direction. A potential is then applied between the straight contour styli and the conductive portions of the tolerance bars associated with them and if all the straight contour styli are on the conductive portions of the tolerance bars at one time, the angularly oriented contour of the blade is correct.

If the blade is rejected for any reason, a recording means, not shown in this application but shown in the copending application Serial No. 578,841, will be set into operation and the probes will go through the probing operation once again with a recording mechanism recording the advance of the probes and the contour of the blades.

While the invention has been described in its application to testing turbine blades and buckets and in conjunction with the apparatus described in the copending application Serial No. 578,841, it is obvious that the invention can be used to compensate for the translational displacement or the twist of any type of test piece when making any measurement. The mechanism can be used either alone or it can be modified to be used in conjunction with any other testing apparatus.

While a particular embodiment of the present invention has been shown and described, it is apparent that changes and modifications may be made without departing from this invention in its broader aspects. Therefore, the aim in the appended claims is to cover all such changes and modifications as fall within the true spirit of the invention.

We claim:

1. Apparatus for measuring a contour in a given plane of a surface of a workpiece comprising, a plurality of probes positionally related in a predetermined manner to a reference point and adapted by parallel motions in said plane to approach and become arrested by respective mutually spaced portions of said surface, said arrested probes representing by their positions an absolute contour of said surface, a plurality of probe position indicating members which are adapted to undergo motions in parallel paths, each member being interlocked in motion and in arrest of motion with a corresponding one of said probes whereby said members are arrested in positions collectively representing said absolute contour, a plurality of contour comparison elements each corresponding to one of said members and movable in the motion path thereof, said elements having a positional disposition among themselves adapted to match the positional disposition of said arrested members when said surface is of a standardized contour, and means operable after said members are arrested and by moving said elements into proximity with said members to produce a comparison of the degree of matching of the disposition of said arrested members with said disposition of said elements to thereby indicate the degree to which the actual contour of said surface matches said standardized contour therefor.

2. A tolerance-measuring apparatus for testing a workpiece that is twisted, comprising a plurality of probes mounted for respective movements into contact with respective localities on the surface of said workpiece, an indicator comprising a first part and a second part, said first part including a plurality of movable elongated members of which each corresponds to a respective one of said probes, and of which each has a reference portion delineated thereon, and said second part including a plurality of adjustably mounted styli of which each corresponds to a respective one of said members, means to move said probes into contact with said workpiece, means to move each of said members in synchronism with the motion into contact of the corresponding probe so as to render the final position of the reference portion on such member representative of the position at contact of such probe, lever means coupled to said probes to adjust the position of said styli of said second part by an amount representative of the twist of the workpiece being tested, drive means to cause each of said styli of said second part to sweep over the corresponding one of said elongated members of said first part, and means to provide a comparative indication of the respective positions of said styli relative to the reference portions of the members respectively swept over by said styli.

3. A tolerance-measuring apparatus for testing a workpiece that is twisted, comprising a plurality of probes mounted for respective movements into contact with respective localities on the surface of said workpiece, an indicator comprising a first part and a second part, said first part including a first group of movable tolerance bars and a second group of movable tolerance bars, each of said tolerance bars corresponding to a respective one of said probes, a reference portion delineated on each of said tolerance bars, said second part including a first group of styli and a second group of adjustably-mounted styli, each of said styli corresponding to a respective one of said tolerance bars, each of said probes being coupled to and determinative of the position of the corresponding tolerance bar so as to render the final position of the reference portion on such tolerance bar representative of the position at contact of such probe, lever means coupled to selected ones of said tolerance bars of said second group to adjust the position of said second group of styli by an amount representative of the twist of the workpiece being tested, drive means to cause each of said first group of styli to sweep over the corresponding one of said first group of tolerance bars to determine the angularly-oriented contour of the workpiece, and a second drive means to cause each of said second group of styli to sweep over the corresponding one of said second group of tolerance bars to determine the pure contour of the workpiece, and means to provide a comparative indication of the positions of said styli relative to those of said reference portions of the members respectively swept over by said styli.

4. Twist-compensating apparatus for testing a workpiece that is twisted, comprising a plurality of probes mounted for respective movements into contact with respective localities on the surface of said workpiece, a plurality of tolerance bars, means coupling each of said probes to a different and corresponding one of said tolerance bars, a reference portion delineated on each tolerance bar, a plurality of styli, means mounting said styli so that each of said styli is adapted to sweep over a different and corresponding one of said tolerance bars, means for adjusting the position of some of said styli to cause the adjusted styli to assume the twist of the workpiece, a first drive means to move said probes into contact with respective localities on the surface of said workpiece and determine the position of each of said tolerance bars in accordance with the contact locality of the corresponding probe, a second drive means for causing each of said styli to sweep over the tolerance bar corresponding thereto, and automatic indicating means connected to said reference portions and said styli to provide a comparative indication of the respective positions of said styli relative to those of said reference portions, whereby a determination of the acceptability of the workpiece is facilitated.

5. A twist-compensating apparatus for testing a workpiece that is twisted, comprising a plurality of probes, a plurality of tolerance bars, means coupling each of said probes to a different and corresponding tolerance bar, a reference portion delineated on each tolerance bar, drive means for moving said probes into contact with respective localities on the surface of said workpiece and determining the position of each of said tolerance bars in accordance with that of the corresponding probe so as to render the final position of the reference portion on such tolerance bar representative of the position at contact of such probe, a plurality of styli mounted on a styli carriage, each of said styli corresponding to a respective one of said tolerance bars, drive means for said styli carriage to cause each of said styli to sweep over the corresponding one of said tolerance bars, four of said styli having their positions adjustable on said styli carriage, means linking two of said tolerance bars to said adjustable styli, means coupling said adjustable styli together so that the tolerance bars and the four adjustable styli are offset in a manner representative of the twist of the workpiece, and indicating means connected between said reference portions and said styli to provide a comparative indication of the respective positions of said styli relative to said reference portions, whereby a determination of the acceptability of the workpiece is facilitated.

6. A twist-compensating apparatus for measuring the contour of a turbine blade or the like that is twisted, comprising a plurality of probes mounted on a probe carriage for respective movements into contact with respective localities on the surface of said blade, a plurality of solenoid disconnect mechanisms, a linkage coupling said plurality of solenoid disconnect mechanisms, drive means for driving said probe carriage and said linkage in synchronism, a plurality of tolerance bars, a reference portion delineated on each tolerance bar, each of said solenoid disconnect mechanisms being connected to and adapted to move a different and corresponding one of said tolerance bars, electrical means connecting each of said probes to a different and corresponding one of said solenoid disconnect mechanisms so that when a probe contacts a locality on the surface of said blade the corresponding solenoid disconnect mechanism is actuated and releases the tolerance bar, a styli carriage, a plurality of contour styli mounted on said styli carriage, drive means for moving said styli carriage to cause each of said contour styli to sweep over a different and corresponding one of said tolerance bars, four of said contour styli being coupled together and having their positions adjustable on said styli carriage, two of said tolerance bars being coupled to said adjustable contour styli, and indicating means connected between said contour styli and said reference portions to provide a comparative indication of the respective positions of said contour styli relative to said reference portions, whereby a determination of the acceptability of the contour of the workpiece is facilitated.

References Cited in the file of this patent
UNITED STATES PATENTS

| | | |
|---|---|---|
| 2,827,709 | Clifford | Mar. 25, 1958 |
| 2,835,042 | Tandler | May 20, 1958 |
| 2,860,420 | Denman | Nov. 18, 1958 |